April 14, 1942.  A. NAGEL  2,279,715
INDICATING DEVICE FOR ROLL FILM CAMERAS
Filed Aug. 19, 1939
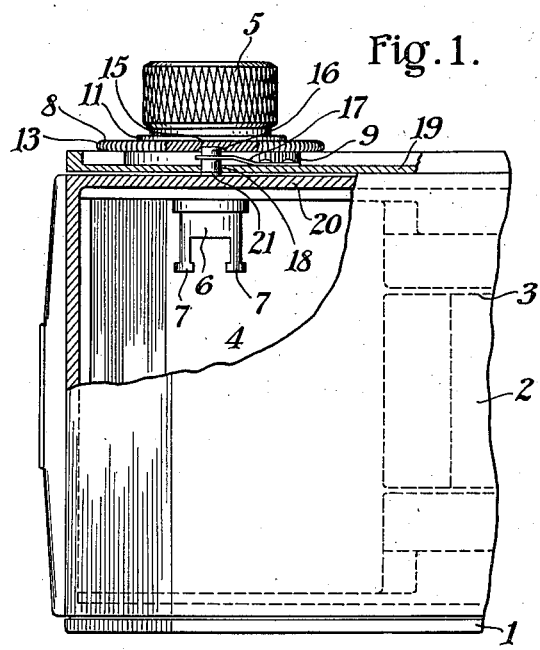
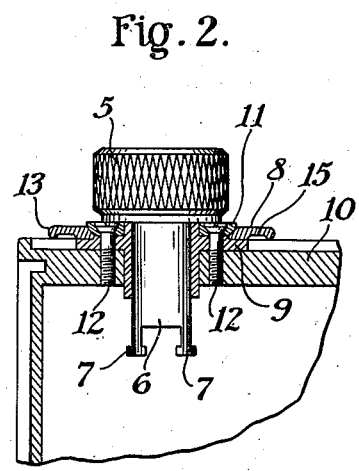
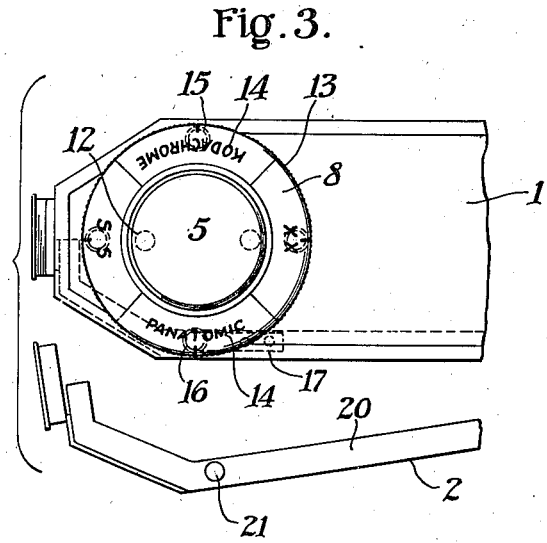
Inventor
August Nagel
By
Attorneys Patented Apr. 14, 1942

2,279,715

UNITED STATES PATENT OFFICE 2,279,715

INDICATING DEVICE FOR ROLL FILM CAMERAS

August Nagel, Stuttgart-Degerloch, Germany, assignor to Eastman Kodak Company, Rochester, N. Y., a corporation of New Jersey Application August 19, 1939, Serial No. 291,055 In Germany April 28, 1939

1 Claim. (Cl. 116—114)

This invention relates to photography, and more particularly to an indicator for photographic cameras which will show what type of film is loaded in a camera.

One object of my invention is to provide a scale plate which is movably mounted on a camera and which may be latched against movement when the camera is loaded with film. Another object of my invention is to provide a scale plate which can be moved to a plurality of positions which may be determined by a friction latch, and to provide a means on the camera for holding the elements of the friction latch against movement when the door, through which the camera is loaded, is in a closed position. Another object of my invention is to provide a scale plate which may be turned about an axis and which may be held in any one of a plurality of positions by means of a snap latch operated by the camera back, and to provide a means for automatically releasing the positive latch when the camera back is opened to load film into the camera. Other objects will appear from the following specification, the novel features being particularly pointed out in the claim at the end thereof.

Coming now to the drawing wherein like reference characters denote like parts throughout:

Fig. 1 is a fragmentary rear elevation, shown partially in section, of a typical camera equipped with a dial plate constructed in accordance with and embodying a preferred form of my invention.

Fig. 2 is a sectional view of parts of the camera shown in Fig. 1.

Fig. 3 is an end elevation of parts of the camera shown in Fig. 1 with the camera back in an open position.

As a preferred embodiment of my invention, I have shown my adjustable scale plate mounted on a typical camera which may be a roll film camera, and which may consist of a camera body portion 1, having a back 2 which may be separated from the camera body by swinging about a known type of hinge, or by removing it completely from the camera body. The camera body 1 may be provided with an exposure frame 3, and there may be a film chamber 4 at one end into which film may be wound by a winding key 5, carried by a rotary post 6 having film turning members 7.

In accordance with my invention, I prefer to place a scale plate 8, coaxial with the winding knob 5, and, as indicated in Fig. 2, this may be done by mounting the plate 8 to turn on a bearing member 9 which is attached to a top wall 10 of the camera by means of a flange 11, fastened in place by the screws 12. Thus, the bearing for the plate 8 consists of the members 9 and 11, which are preferably so fitted that the dial plate 8 may turn freely. I prefer to provide a knurling 13 around the edge of the dial plate to facilitate turning it.

This dial plate may be provided with a series of film indicating designations 14, here shown as "Kodachrome, XX, Panatomic, and SS," indicating known types of photographic film, but it is obvious that the scale plate may be divided into as many graduations as desirable, as it may obviously be turned through any desired number of degrees in adjusting the proper indication in position to show the type of film with which the camera is loaded.

In the present instance, I prefer to have the word indicating the film facing the camera back 2, to indicate the type of film so that with the dial set as in Fig. 3, it is indicated that Panatomic film is in the camera. However, a pointer or other indicating mark may be used, if desired.

In order to facilitate adjusting the dial to its proper position, I have provided a plurality of beveled apertures 15 on the underside of the dial plate 8, these apertures being spaced in accordance with the spacing of the film indicating designations 14. These apertures constitute a plurality of detents, any one of which is adapted to engage a latch element, in the form of a plunger 16 normally held by a spring 17, by which the plunger is carried, against the underside of the dial plate. Thus, if the dial plate is turned, the spring plunger will always tend to center any designating area of the dial plate in its proper indicating position.

The plunger 16 operates through an aperture 18 in the upper camera wall 19, and when the camera back is in an open position, it merely serves as a spring detent tending to hold the dial plate in any set position, but permitting the dial plate to be freely turned. However, after the film has been loaded into the camera and the dial plate has been properly set, it may be definitely latched in a fixed position by means of the camera back 2 which may slide under the aperture 18 of the end wall 19 of the camera, and thus prevent movement of the plunger 16, definitely locking it in a fixed or set position, thus holding the dial plate in a set position. Any part of the camera back or a part attached thereto may be used for this latching operation.

I find it convenient, however, to attach to a flange 20 on the camera back, a short stud 21 which will lie beneath the plunger 16, because by doing this, the stud may be filed off and thus readily fitted to hold the latch elements in the proper engagement without otherwise altering parts of the camera. This structure, however, is not necessary.

It is obvious from the above description that my invention may take many different forms, and it is understood that the above description of the camera shown in the drawing is only a preferred embodiment of my invention and is given by way of illustration of a preferred form thereof.

It will be readily seen that any film camera having a door through which film is loaded into the camera may be equipped with a movably mounted dial plate which may be latched in position as the door is closed irrespective of the type or shape of the camera used. I therefore consider as within the scope of my invention, any cameras as may come within the scope of the appended claim.

What I claim is:

In a film camera, a film winding spindle rotatably mounted in an exterior wall of said camera, a film indicator including a dial plate loosely mounted on said spindle and positioned exteriorly of said wall, said plate having a plurality of film designations formed on the exposed face thereof and adapted to be selectively and manually positioned to indicate the particular type of film in said camera, a plurality of detents formed on the other face of said plate, a film chamber and a door for closing said chamber, a plunger operable through an aperture in said wall under said plate, a spring secured to said wall and engaging said plunger to move the latter toward said plate and into engagement with one of said detents to releasably retain said plate in a position of adjustment, and a portion of said plunger positioned so that a part of said door will substantially engage said portion when said door is in chamber closing position to retain said plunger in engagement with said one detent to lock said plate in adjusted position.

AUGUST NAGEL.